No. 736,928. PATENTED AUG. 25, 1903.
A. LE R. BOLEN & G. E. KRAUSE.
ELECTRIC MOTOR AND GENERATOR.
APPLICATION FILED OCT. 25, 1901.
NO MODEL. 2 SHEETS—SHEET 1.
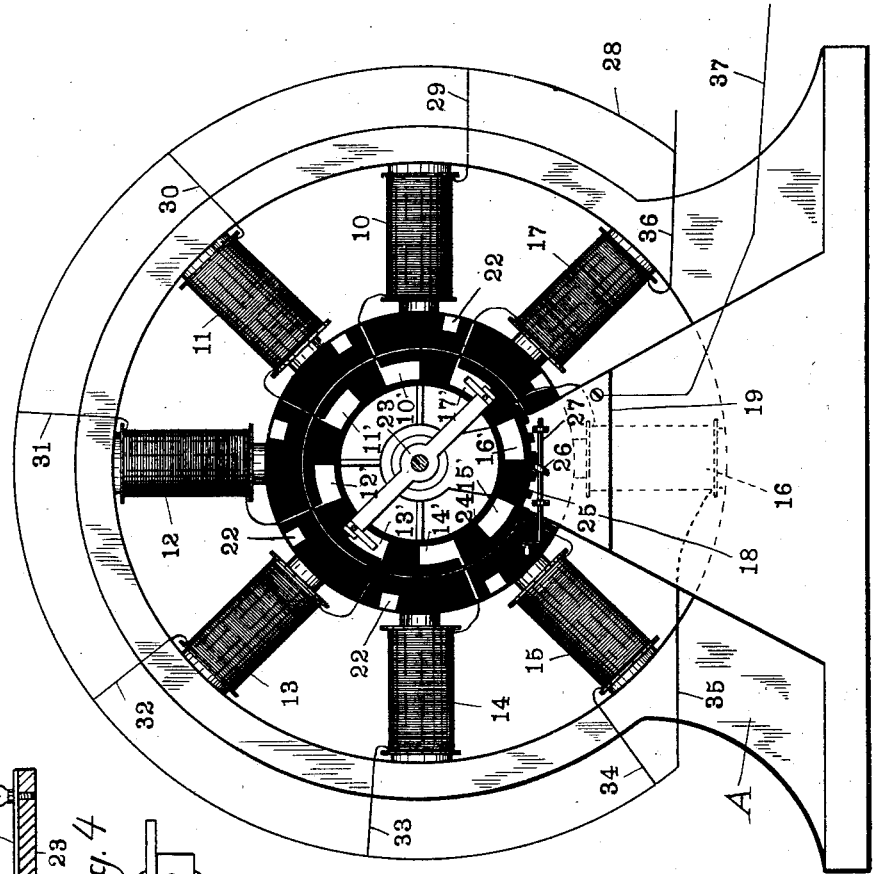
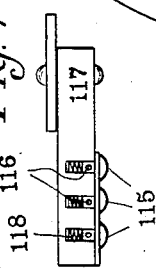
Witnesses
Adelaide Kearns.
J. A. Walsh.
Inventors
Arthur L. Bolen
George E. Krause
By
Bradford Hood
Attorneys

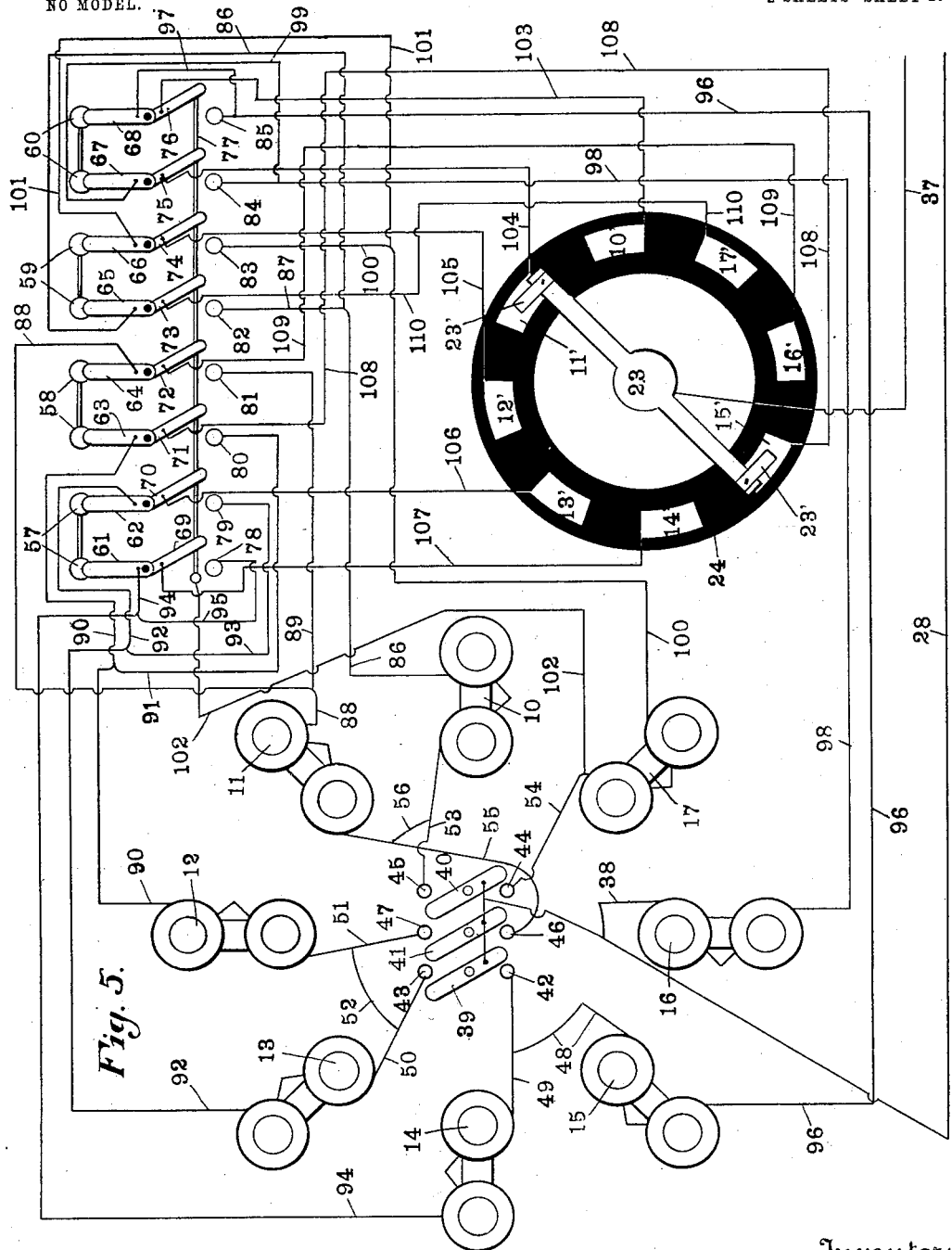

No. 736,928. Patented August 25, 1903.

UNITED STATES PATENT OFFICE.

ARTHUR LE ROY BOLEN AND GEORGE EDWARD KRAUSE, OF INDIANAPOLIS, INDIANA.

ELECTRIC MOTOR AND GENERATOR.

SPECIFICATION forming part of Letters Patent No. 736,928, dated August 25, 1903.

Application filed October 25, 1901. Serial No. 80,009. (No model.)

*To all whom it may concern:*

Be it known that we, ARTHUR LE ROY BOLEN and GEORGE EDWARD KRAUSE, citizens of the United States, residing in Indianapolis, county of Marion, and State of Indiana, have invented a new and useful Electric Motor and Generator, of which the following is a specification.

The object of our invention is to produce an electric motor without an armature-winding and to provide means by which the speed of the rotation of the armature may be controlled.

The accompanying drawings illustrate our invention.

Figure 1 is a side elevation; Fig. 2, a perspective of our improved armature; Fig. 3, an enlarged detail of the commutator-brush; Fig. 4, a detail of a modified form of the brush, and Fig. 5 a diagrammatic view of the controller mechanism and the wiring therefor.

In the drawings, 10, 11, 12, 13, 14, 15, 16, and 17 indicate a plurality of electromagnets supported substantially radially to a common axis within a suitable frame A. Frame A carries at each end a bearing-block 18, which is insulated from frame A, as indicated at 19, and journaled in these boxes is a shaft 20 of an armature 21. The main body of armature 21 is composed of insulating material, and secured to the periphery of the drum is a plurality of strips 22, of material which will be materially attracted (such as soft iron) or repelled by the electromagnets, said strips being equal in number to the number of magnets already described. Secured to the outer end of shaft 20, so as to rotate therewith, is a brush-holder 23, which carries at each end a brush 23', preferably in form of a roller, as shown in Fig. 3. Secured to one of blocks 18, concentric with the armature-shaft and preferably adjusted around said shaft, is a commutator disk or drum 24, which in Fig. 1 is shown provided with a plurality of teeth 25, engaged by a worm 26, carried by the adjusting-shaft 27. Secured to the commutator 24 and insulated from each other is a plurality of terminal plates 10', 11', 12', 13', 14', 15', 16', and 17', corresponding in number and arrangement to the electromagnets 10 to 17, inclusive. The line-wire 28 is connected by wires 29, 30, 31, 32, 33, 34, 35, and 36 in parallel with the windings of the magnets 10, 11, 12, 13, 14, 15, 16, and 17, respectively, and each of said windings is connected to the corresponding terminal plate 10', 11', 12', 13', 14', 15', 16', and 17' of the commutator. The other line-wire 37 is connected to one of the bearing-blocks or may be connected by a brush with the armature-shaft of the rotating brush-holder 23.

In operation suppose the parts to be in the position shown in Fig. 1 the current will pass from line-wire 28 through wire 36 to the magnet 17, from thence to plate 17', and thence through the coacting roller 23' to the brush-holder 23. Simultaneously the current passes from wire 28 through wire 32 to the magnet 13, from thence to plate 13' and its connecting-brush 23', to holder 23, and from thence both sides of the current pass through block 18 to the opposite line-wire 37. This action energizes the magnets 17 and 13 at opposite sides of the armature, and these attract the adjacent bars 22 of the armature 21 and cause said armature to rotate. The rotation of the armature carries brush-holder 23 with it, and when the attracted parts 22 have come nearly opposite the magnets 13 and 17 the brushes 23' have been moved off the plates 13' and 17' and the current is withdrawn from the magnets 13 and 17. A continued movement of the armature, due to its inertia, will bring the brushes 23' into contact with the plates 10' and 14', thus energizing the magnets 10 and 14, whereupon the action is repeated.

In order to obtain the highest speed, it is desirable that all of the magnets should act simultaneously, and for this reason we have provided the system of wiring shown in Fig. 5, in which we show diagrammatically the eight magnets 10, 11, 12, 13, 14, 15, 16, and 17, the eight plate-terminals 10', 11', 12', 13', 14', 15', 16', and 17', respectively, the revoluble brush-holder 23, and brushes 23', and the main-line wire 37, connected to the brush-holder. The main-line wire 28, however, is connected to the coil of magnet 16 by a wire 38 and is also connected to three switch-plates 39, 40, and 41, which are pivoted at their middles. Switch 39 in its medial position bridges between a pair of terminals 42 and 43, switch 40 bridges between a pair of terminals 44 and 45, and switch 41 bridges between a pair of terminals 46 and 47. Terminal 42 is connected by wires 48 and 49 with the coils of magnets 15 and 14, respectively, terminal 43 is connected by wire 50 with the coil of magnet 13, and terminal 47 is connected by wire 51 with the coil of magnet 12. Wires 50 and 51 are connected between the terminals and the coils by a bridge-wire 52. Terminal 45 is connected by wire 53 with the coil of magnet 10, terminal 44 is connected by a wire 54 with the coil of magnet 17, terminal 46 is connected by a wire 55 with the coil of magnet 11, and wires 55 and 53 are bridged between the coils and terminals by bridge-wire 56.

Turning now to the upper right-hand corner of Fig. 5, there are four pairs of bridge-terminals 57, 58, 59, and 60. The terminal 57 may be engaged by the free ends of a pair of switches 61 and 62, terminal 58 may be engaged by the free ends of switches 63 and 64, terminals 59 may be engaged by the free ends of switches 65 and 66, and terminal 60 may be engaged by the free ends of switches 67 and 68. Pivoted to the same standards to which switches 61 and 68, inclusive, are pivoted, but insulated from said switches, are terminals 69, 70, 71, 72, 73, 74, 75, and 76, respectively, the free ends of all of which may rest upon the bar-terminal 77, or each may be thrown from said bar-terminal 77 into engagement with terminals 78, 79, 80, 81, 82, 83, 84, and 85, respectively. The coil of magnet 10 is connected by a wire 86 with switch 65, and wire 86 is connected by wire 87 at an intermediate point with terminal 82. The coil of magnet 11 is connected by a wire 88 with switch 64, and wire 88 is connected by wire 89 at an intermediate point to terminal 81. The coil of magnet 12 is connected by wire 90 with switch 63, and wire 90 is connected by wire 91 at an intermediate point with terminal 80. The coil of magnet 13 is connected by wire 92 with switch 62, and wire 92 is connected by wire 93 at at intermediate point with terminal 79. The coil of magnet 14 is connected by wire 94 with switch 61, and wire 94 is connected by wire 95 at an intermediate point with terminal 78. The coil of magnet 15 is connected by wire 96 with terminal 85, and wire 96 is connected by wire 97 at an intermediate point with switch 68. The coil of magnet 16 is connected by wire 98 with terminal 84, and wire 98 is connected by wire 99 at an intermediate point with switch 67. The coil of magnet 17 is connected by wire 100 with terminal 83, and wire 100 is connected by wire 101 at an intermediate point with switch 66. Wire 54, which connects terminal 44 with that end of coil of magnet 17 opposite wire 100, is connected by wire 102 with the bar-terminal 77. Plate 10' is connected by wire 103 with switch 76, plate 11' is connected by wire 104 with switch 75, plate 12' is connected by wire 105 with switch 74, plate 13' is connected by wire 106 with switch 70, plate 14' is connected by wire 107 with switch 69, plate 15' is connected by wire 108 with switch 71, plate 16' is connected by wire 109 with switch 72, and plate 17' is connected by wire 110 with switch 73.

Suppose now that the several parts be in the position shown in Fig. 5, the current coming in through line-wire 37 and passing through brush-holder 23 and from thence through one of the brushes 23', the plate 11', wire 104, switch 75, bar 77, (the current also passes through the other brush 23', plate 15', wire 108, and switch 71 to bar 77,) from thence through wire 102 to the coil of magnet 17, thence through wire 100, wire 101, switch 66, bridge 59, switch 65, wire 86, through the coil of magnet 10, from thence through wire 53, bridge 56, and wire 55 to the coil of magnet 11, from thence through wire 88 to switch 64, bridge 58, switch 63, wire 90 to the coil of magnet 12, thence through wires 51, 52, and 50 to the coil of magnet 13, thence through wire 92 to switch 62, bridge 57, switch 61, wire 94, through the coil of magnet 14, thence through wires 49 and 48, through the coil of magnet 15, thence through wires 96 97 to switch 68, bridge 60, switch 67, wires 99 and 98 to the coil of magnet 16, and from thence through wire 38 to the other main line 28. All of the coils of the magnets are thus placed in series, each magnet thus acting upon the next adjacent bar 21 of the armature, so as to rotate the armature. The rotation of the armature, however, causes a withdrawal of the brushes 23' from the plates 11' and 15', and thereupon the current ceases through the coils of the several magnets until the brushes 23' come into contact with the plates 12' and 16', whereupon the coils of the several magnets are again placed in series.

Suppose now that switches 61 to 68, inclusive, be thrown off the bridges 57 to 60, inclusive, and switches 69 to 76, inclusive, be thrown from bar 77 on to the terminals 78 to 85, respectively, while switches 39, 41, and 40 are thrown to connect terminals 43 and 42, 47 and 46, 45 and 44, respectively. Assuming the position of brush 23 to be that shown in Fig. 5, the circuits are as follows: from the main line 37, through brush-holder 23, brush 23', plate 11', wire 104, switch 75, terminal 84, wire 98, coil of magnet 16, wire 38 to the opposite main line 28, at the same time through holder 23, through the other brush 23', plate 15', wire 108, switch 71, terminal 80, wire 91, wire 90, coil of magnet 12, wire 51, terminal 47, switch 41, to wire 28. The coils of magnets 12 and 16 are thus in parallel and the remaining coils are out, these coils being cut in in parallel in successive diametrically-opposed pairs as the brush-holder 23 is rotated. By multiplying the arms of brush-holder 23 any desired number of pairs of magnets may be energized in parallel at the same time.

Suppose now that the switches 69 to 76, inclusive, be allowed to remain upon the terminals 78 to 85, inclusive, and that the switches 67 and 68 be thrown from the bridge 60. With the brush-holder 23 in the position shown in Fig. 5 the current passes from line-wire 37 to brush-holder 23, brush 23', plate 11', wire 104, switch 75, terminal 84, wire 98, coil of magnet 16, wire 38, to the main-line wire 28. At the same time the current branches from wire 98 to wire 99, but cannot pass beyond switch 67. At the same time the current passes through the other brush 23', plate 15'; wire 108, switch 71, terminal 80, wire 91, to wire 90, from thence it branches, going one way along wire 90 to the coil of magnet 12, and from thence through wire 51, terminal 47, switch 41 to wire 28, and in the opposite direction along the other end of wire 90 to switch 63, bridge 58, switch 64, wire 88, coil of magnet 11, wire 55, terminal 46, switch 41 to line-wire 28, magnets 16, 11, and 12 being thus thrown in parallel, while the remaining magnets remain deënergized. Turning the brush-holder, so that brushes 23' 23' rest upon plates 16' and 12', the current passes through the plate 12', wire 105, switch 74, terminal 83, wire 100, coil of magnet 17, wire 54, terminal 44, switch 40 to line-wire 28, and at the same time branching from wire 100 to wire 101, thence to switch 66, bridge 59, switch 65, wire 86, coil of magnet 10, wire 53, terminal 45, switch 40 to line-wire 28, also through plate 16', wire 109, switch 72, terminal 81, wire 89 to wire 88, from which the current goes in opposite directions along wire 88 in one direction to the coil of magnet 11, through wire 55, terminal 46, and switch 41 to the line-wire 28, and in the other direction going to switch 64, bridge 58, switch 63, wire 90 to the coil of magnet 12, through wire 51, terminal 47, switch 41 to the line-wire 28, the coils of the four magnets 17, 10, 11, and 12 being parallel. It will be seen, therefore, that by withdrawing terminals 61 to 68 in pairs the number of coils in circuit may be varied to vary the speed of rotation. It will also be seen that by throwing off any one of the terminals 69 to 76, inclusive, any one of the coils of the magnets may be thrown out.

Any suitable form of brush 23' may be used, but in order that the wear upon the brush and terminal plates may not be too great we prefer to make said brushes in roller form, as illustrated in Figs. 3 and 4. In Fig. 3 the brush consists of a single roller 111, journaled in the holder 112, hinged by means of spring-hinge 113 to the plate 114, which may be secured to an arm of the brush-holders 23. In form shown in Fig. 4 a plurality of rollers 115, journaled in sets upon shafts 116, are substituted for the single roller 111. The shafts 116 are supported in slotted bearings formed in a block 117 and yieldingly held by means of springs 118.

We claim as our invention—

1. In a motor, the combination of a rotatable drum, a plurality of armature-bars carried thereby, a plurality of electromagnets arranged radially about said drum, a plurality of terminal plates one for each electromagnet arranged about the drum and each connected to one of the electromagnets, a pair of brushes engaging said plates in successive pairs, a connection between said brushes and one side of an energizing-circuit, and connections between said energizing-circuit and the opposite ends of the electromagnet-coils, whereby said electromagnets may be intermittently energized in successive parallel pairs.

2. In a motor, the combination of a plurality of electromagnets, a series of terminals one for each end of the coil of each magnet, a series of switches one for each of said terminals, said switches being adapted to be thrown into contact each with its terminal or with a terminal bar, said terminal bar, a connection between said terminal bar and one of the electromagnet-coils, a connection between each electromagnet-coil and one side of an energizing-circuit, a series of terminal plates one for each magnet-coil, a connection between each of said plates and one of said switches, a pair of brushes adapted to engage said terminal plates in successive pairs, a rotating drum operating said brushes, a series of armature-bars carried by said drum, adjacent the magnets, a series of pairs of switches, the number of pairs being equal to half the number of electromagnets, connections between said switch pairs and the connections between the first-mentioned series of terminals and the electromagnet-coils, for the purpose set forth.

ARTHUR LE ROY BOLEN.
GEORGE EDWARD KRAUSE.

Witnesses:
CLARENCE C. MOON,
LEWIS H. MCCREA.